Patented Nov. 18, 1930

1,782,259

UNITED STATES PATENT OFFICE

JOHN EGGERT, OF LEIPZIG, AND RICHARD SCHMIDT AND BRUNO WENDT, OF DESSAU-IN-ANHALT, GERMANY, ASSIGNORS TO AGFA ANSCO CORPORATION, OF BINGHAMTON, NEW YORK, A CORPORATION OF NEW YORK

LIGHT-SENSITIVE LAYER AND PROCESS OF MAKING PHOTOGRAPHIC IMAGES

No Drawing. Application filed July 12, 1929, Serial No. 377,911, and in Germany July 17, 1928.

The present invention relates to light-sensitive layers and to a process of making photographic images on the same. More particularly it relates to layers containing as a light-sensitive substance an ethylene derivative forming cis-trans-isomerides.

It is known that compounds having two carbon atoms connected by double linking (that is to say: ethylene derivatives) exist in cis-trans-isomeric forms when the other valencies of the two carbon atoms are saturated by radicals of different kind. A known example of such compounds is afforded by maleic and fumaric acids, the former of which is the cis-form and the latter the trans-form. The stereoisomeric forms of the compounds differ from each other in their physical and chemical properties. By chemical action the cis-form of a stereoisomeric compound can be converted into the trans-form. This change can also be brought about by the action of energy in the form of light, for example.

We found that this conversion of one stereoisomeric compound into another can be applied for photographic purposes. A colloid suitable as a carrier for a substance sensitive to light, for instance gelatine, collodion, or regenerated cellulose is mixed with an ethylene derivative forming cis-trans-isomerides and the mixture is subjected to the action of light, whereby the ethylene derivative passes into its stereoisomeric form. In some cases the substance sensitive to light may be carried by paper, textile fabric or the like instead of by one of the said colloids. For accelerating the stereoisomeric change a catalyst may be added to the colloid layer and in this respect a halogen, or a substance which yields halogen in presence of light, is particularly applicable, for instance mercuric bromide, tetrabromethane, ω-bromacetophenone, or a perbromide.

For making a photographic image according to our invention we expose a photographic surface thus prepared to locally differentiated light, f. i., in a camera or under a negative. There is obtained in the colloid layer a picture, the non-illuminated portions of which contain the unchanged sensitive substance, while in the illuminated portions, correspondingly with the degree of illumination, there exists more or less of the stereoisomeric compound.

When one of the two stereoisomeric compounds is colored and the other colorless or of a different color there is produced forthwith a visible picture which only requires to be fixed. A practicable picture is also produced at once when one of the stereoisomerides is fluid and the other solid.

In order to fix the picture it may be treated with a solvent which dissolves only one of the stereoisomerides. Another method applicable when a catalyst is being used is to separate or destroy this catalyst, so that no further change of the unaltered stereoisomeric is likely to occur.

The picture can be rendered more visible by selection of a suitable background contrasting with the color of the one isomeride. So also for improving the visibility of the picture the difference in chemical behaviour shown by the two stereoisomerides may be applied. For example, one of the forms may be changed by esterification, salt formation or by substitution, the other remaining unchanged by the operation, and the altered product can then be converted into a colored substance. When both forms are susceptible to the same reaction, the reaction product of the one may be separated from that of the other. The developed picture may be a positive or a negative of the original according to the nature of the sensitive compound selected. Physical development is also possible.

The following examples may be given as illustrative of our invention:—

*Example 1.*—Black paper is coated with a collodion layer which contains trans-dibenzoylethylene as the sensitive substance. After exposure to light the picture is fixed by treatment with ethanol. From a positive there is produced a positive.

*Example 2.*—White paper is saturated with a solution of maleic acid in water or aqueous alcohol and is then sensitized by means of bromine vapour. After exposure the paper is bathed in a solution of silver nitrate of 1 per cent strength or a solution of mercuric acetate of 4 per cent strength. In this manner there is produced the sparingly soluble silver or mercury salt of the fumaric acid which has been formed by the action of light, while the corresponding salt of maleic acid which is more freely soluble dissolves. After washing and immersion in a bath of alkali chromate of 1 per cent strength, there is produced a picture in silver chromate or mercuric chromate. From a negative there is obtained a positive.

*Example 3.*—A collodion layer containing phenylcitraconic acid and ω-bromacetophenone is exposed and then washed in chloroform to remove the unchanged phenyl-citraconic acid and the catalyst. Development is done by means of a solution of silver- or mercury- or thallium salt, which produces a white picture in the corresponding phenylmesaconic salt, and this with aid of sodium sulfide or a reducing agent may be changed to black.

We claim:

1. A light-sensitive layer containing an ethylene derivative forming cis-trans-isomerides.

2. A light-sensitive layer containing an ethylene derivative which has two carboxyl-groups, and forms cis-trans-isomerides.

3. A light-sensitive layer containing as a light-sensitive substance maleic acid.

4. A light-sensitive layer containing an ethylene derivative and a catalyst, which ethylene derivative forms cis-trans-isomerides.

5. A light-sensitive layer containing an ethylene derivative and a catalyst, which ethylene derivative has two carboxyl groups and forms cis-trans-isomerides.

6. A light-sensitive layer containing maleic acid and a catalyst.

7. A light-sensitive layer containing as a light-sensitive substance an ethylene derivative and as a catalyst a halogen, which ethylene derivative forms cis-trans-isomerides.

8. A light-sensitive layer containing as a light-sensitive substance an ethylene derivative and as a catalyst bromine, which ethylene derivative forms cis-trans-isomerides.

9. A light-sensitive layer containing as a light-sensitive substance an ethylene derivative and as a catalyst bromine which ethylene derivative has two carboxyl groups and forms cis-trans-isomerides.

10. A light-sensitive layer containing as a light-sensitive substance maleic acid and as a catalyst bromine.

11. A process of making photographic images comprising the steps of exposing to locally differentiated light a light-sensitive layer according to claim 1 and of developing in the layer a visible image by utilizing the differences of chemical and physical qualities of the stereoisomerides.

12. A process of making photographic images comprising the steps of exposing to locally differentiated light a light-sensitive layer according to claim 4 and of developing in the layer a visible image by utilizing the differences of chemical and physical qualities of the stereoisomerides.

13. A process of making photographic images comprising the steps of exposing to locally differentiated light a light-sensitive layer according to claim 5 and of developing in the layer a visible image by utilizing the differences of chemical and physical qualities of the stereoisomerides.

14. A process of making photographic images comprising the steps of exposing to locally differentiated light a light-sensitive layer according to claim 9 and of developing in the layer a visible image by utilizing the differences of chemical and physical qualities of the stereoisomerides.

15. A process of making photographic images comprising the steps of exposing to locally differentiated light a light-sensitive layer according to claim 10 and of developing in the layer a visible image by utilizing the differences of chemical and physical qualities of the stereoisomerides.

16. A process of making photographic images comprising the steps of exposing to locally differentiated light a light-sensitive layer according to claim 5, treating the layer with a solution of a metal salt which metal forms a sparingly soluble salt with one of the stereoisomerides, dissolving the metal salt of the other stereoiomeride and converting the remaining picture consisting of the sparingly soluble salt into a colored composition.

17. A process of making photographic images comprising the steps of exposing to locally differentiated light a light-sensitive layer according to claim 9, treating the layer with a solution of a metal salt which metal forms a sparingly soluble salt with one of the stereoisomerides, dissolving the metal salt of the other stereoisomeride and converting the remaining picture consisting of the sparingly soluble salt into a colored composition.

18. A process of making photographic images comprising the steps of exposing to locally differentiated light a light-sensitive layer according to claim 10, treating the layer with a solution of a metal salt which metal forms a sparingly soluble salt with one of the stereoisomerides, dissolving the metal salt of the other stereoisomeride and converting the remaining picture consisting of the sparingly soluble salt into a colored composition.

19. A process of making photographic images comprising the steps of exposing to locally differentiated light a light-sensitive layer according to claim 10, treating the layer with a solution of silver nitrate, washing out the silver salt of maleic acid and treating the remaining picture consisting of the silver salt of the fumaric acid with a solution of alkali chromate.

In testimony whereof, we affix our signatures.

JOHN EGGERT.
RICHARD SCHMIDT.
BRUNO WENDT.